Dec. 29, 1925.　　　　　　　　　　　　　　　　　1,568,000
R. D. SCHMIDT
WINDMILL
Filed June 14, 1924　　　　3 Sheets-Sheet 1

Dec. 29, 1925.  
R. D. SCHMIDT  
WINDMILL  
Filed June 14, 1924  
1,568,000  
3 Sheets-Sheet 2

R. D. Schmidt  
INVENTOR  
BY Victor J. Evans  
ATTORNEY

WITNESS:

Dec. 29, 1925.
R. D. SCHMIDT
1,568,000
WINDMILL
Filed June 14, 1924    3 Sheets-Sheet 3
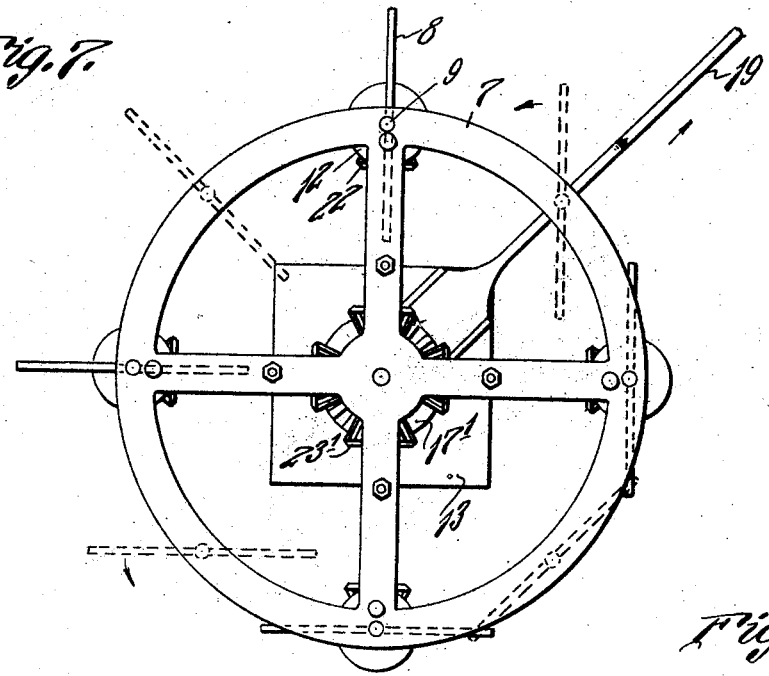
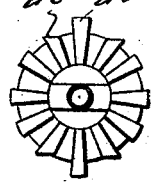
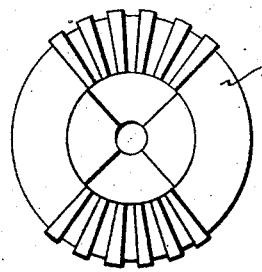
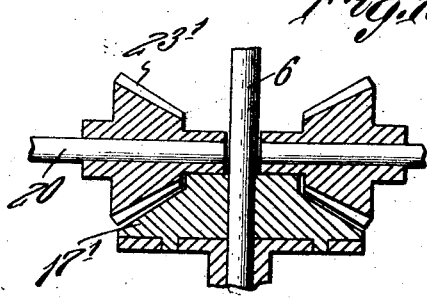
R. D. Schmidt
INVENTOR
BY Victor J. Evans
ATTORNEY
WITNESS:

Patented Dec. 29, 1925.

1,568,000

UNITED STATES PATENT OFFICE.

ROBERT D. SCHMIDT, OF DAVENPORT, IOWA.

WINDMILL.

Application filed June 14, 1924. Serial No. 720,047.

*To all whom it may concern:*

Be it known that I, ROBERT D. SCHMIDT, a citizen of the United States, residing at Davenport, in the county of Scott and State of Iowa, have invented new and useful Improvements in Windmills, of which the following is a specification.

My invention relates to wind mills and particularly to the class of wind mills known in the art as feathering blade type wind mills.

The principal object of the present invention is to provide a wind mill of this character which possesses a minimum of parts and which will operate at a maximum degree of smoothness and thereby assuring generation of the maximum amount of power.

A further object of the invention is to provide a wind mill which will operate with little resistance to the air current and a minimum of friction between the operating parts.

With the preceding and other objects and advantages in mind, the invention consists in the novel combination of elements, construction and arrangement of parts and operations to be hereinafter specifically referred to, claimed and illustrated in the accompanying drawings, wherein:

Fig. 4 is a fragmentary sectional view of the gearing used in connection with the invention.

Figure 5 is an elevation of one of the gears embodied in the invention.

Figure 6 is a similar view of another gear or pinion embodied in the invention.

Figure 7 is a top plan view of a slightly modified embodiment of the invention showing the blades in full and dotted lines as suggester in Figure 1.

Figure 8 is an elevation of one of the gears embodied in the structure disclosed in Figure 7.

Figure 9 is an elevation of another of the gears embodied in this form of the invention.

Figure 10 is a fragmentary detail sectional view of the gearing; and

Figure 11 is a diagrammatic view of the same.

Figure 3:
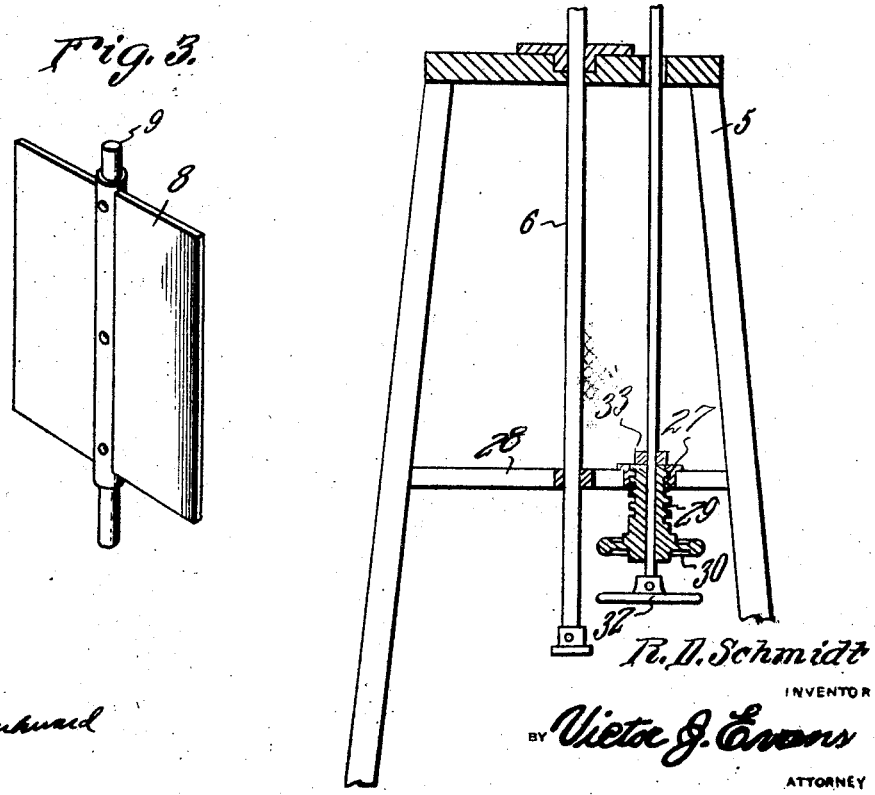
Figure 3 is a perspective of one of the feathering blades embodied in the invention.

Referring to the drawings in detail wherein corresponding characters of reference denote corresponding parts throughout the several views, the numeral 5 designates a support in which a vertically arranged shaft 6 is journaled. Fixed to the upper end of the shaft 6 is a pair of annular rims or frame elements 7 between which the feathering blades 8 are journaled. I have shown in Figure 3 these blades 8 as being provided with pintles 9 at their opposite ends and journaled at the outer edges of the rims as at 10 and which receive lubricant from lubricant cups 11 carried by the upper rim or frame element. The pintle at the lower end of each of the blades 8 is relatively long and fixed to the same is a pinion 12.

Figure 2:
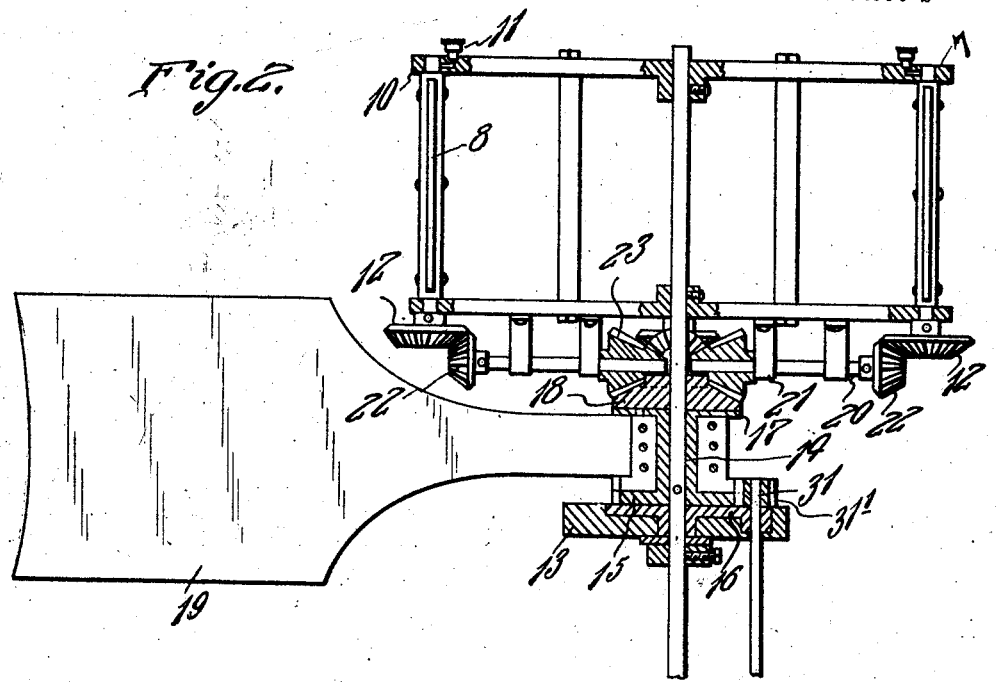
Figure 2 is a vertical sectional view of the same.

Supported on the shaft 6 above the support 5 is a plate 13 and revoluble about this shaft 6 just above the plate 13 is a sleeve 14 formed with a ring gear 15 at its lower end which rests upon a wear plate 16 carried upon the upper face of the plate 13. The upper end of the sleeve 14 is provided with an annular flange 17 upon which the base of a pinion 18 rests, the latter being loosely received on the shaft 6. The usual rudder 19 is fixed to the sleeve 14 and extends laterally therefrom as shown in Figure 2. As shown in Figure 6, the pinion annular flange 17 is provided with teeth for half of its circumference.

Figure 1:
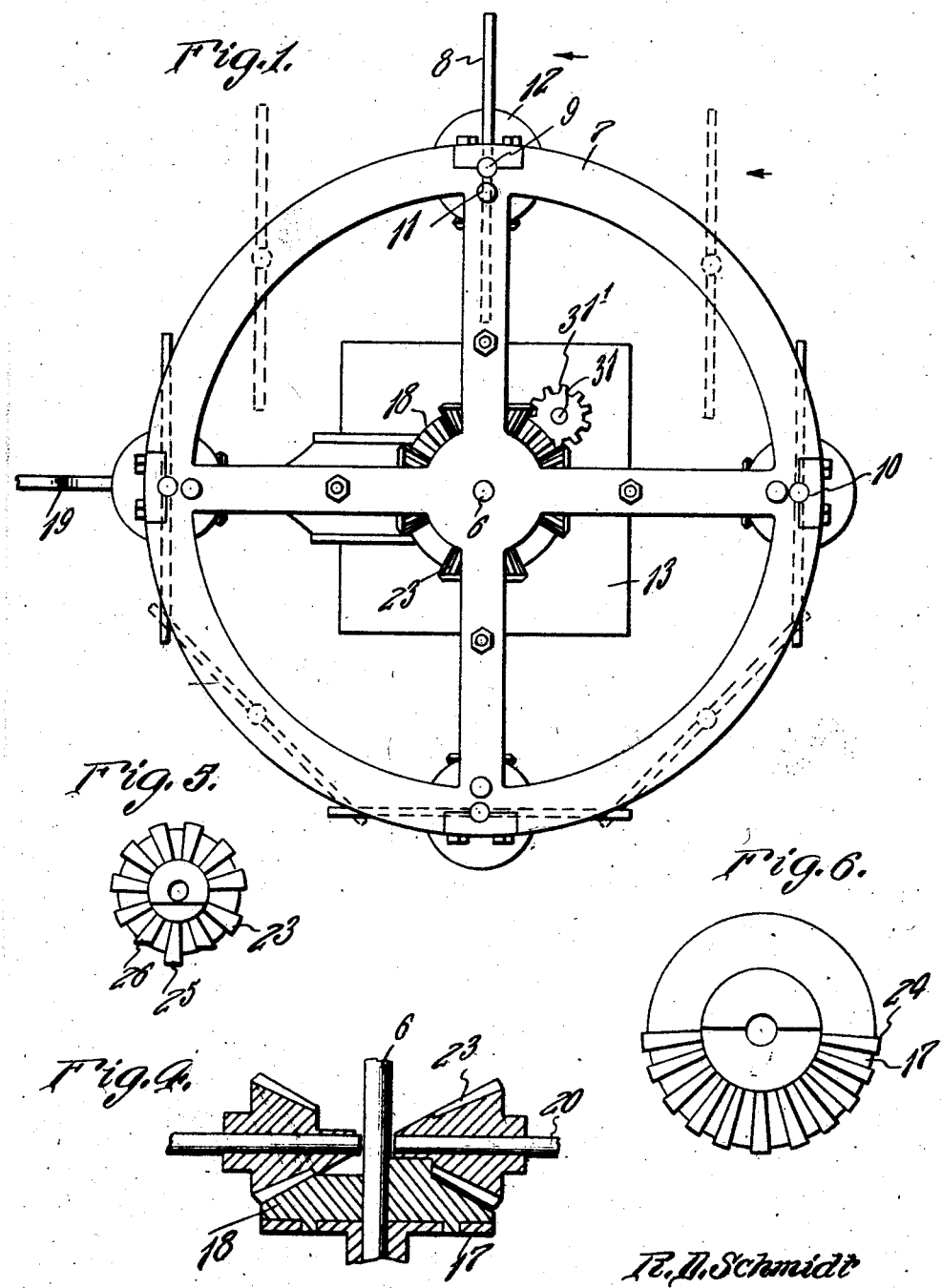
Figure 1 is a top plan view of a wind mill constructed in accordance with my invention and showing the arrangement of the feathering blades in one position, in full lines and in another position in dotted lines, to illustrate the movement of the blades with respect to the wind.

For each of the gears 12 there is provided a stub shaft 20. These stub shafts 20 are journaled in bearings 21 arranged upon the underface of the lower rim or frame member 7 and carry a pinion 22 at their outer ends which mesh with the gear 12. Pinions 23 are fixed to the inner ends of the shaft 20 and are adapted to engage the teeth on the gear 17 whereby to cause the blades 8 to feather at the proper time and the relative positions of the blades are shown in full and dotted lines in Figure 1 of the drawings.

In connection with the gear 18 and gears 23 it will be observed that the endmost teeth of the gear 18 are partly shortened or cut away as indicated at 24 while a single tooth of the gear 23 is slightly longer than the remaining teeth as indicated at 25. The two teeth adjacent the teeth 25 are beveled or cut away as at 26. This structure is provided to permit the gears to catch and release at the proper time.

In order to adjust the rudder axially about the shaft 6, I provide an adjusting mechanism which comprises an internally threaded collar 27 carried by one of the cross struts or braces 28 of the support 5 and vertically adjustable therein is an externally threaded sleeve 29 formed with a hand wheel 30 at its lower end. A shaft 31 extends through this member 29 and through one end of the plate 13 and carries a pinion 32 at its upper end which engages a ring gear 15. An operating handle 32 is carried by its lower end. Fixed to this shaft 31 slightly above the upper end of the member 29 is a shoulder or nut 33. It will be seen that upon rotation of the hand wheel 30 the upper end of the member 29 contacting with the shoulder 33 will lift the shaft 31 vertically and disengage the pinion 31' from the ring gear 15. By simply rotating the hand wheel 32 the ring gear 15 will be adjusted with the shaft 6 to dispose the rudder 19 at the desired point to initially start the wind mill to rotating.

In the modification disclosed in Figures 7 to 11 inclusive, the structure is substantially the same as that disclosed in Figures 1 to 6 inclusive, the difference being in the gear ratio. In this modification, the gear 17 is provided with interrupted parts 17' at diametrically opposite points and the pinions 23' formed with a pair of relatively long teeth 25' at diametrically opposite points and for each of these teeth 25' two adjacent teeth 26' are beveled or cut away in the same manner as the pinion disclosed in Figure 5. In this embodiment of the invention the feathering blades change their position four times every revolution of the frame of rims 7.

While I have shown and described the preferred embodiment of the invention, it is to be understood that changes in the arrangement of parts may be made and that I am only limited by the appended claims.

What is claimed is:—

1. A wind mill comprising a support, a vertical shaft carried thereby, a rotatable frame carried by the shaft, feathering blades journaled in the frame, a base plate arranged on the shaft, a sleeve rotatable on the shaft, a gear formed therewith and resting on the base plate, a rudder carried by the sleeve, a manually operable rotatable shaft journaled in the support, a pinion carried thereby, and adapted to be brought into or out of engagement with the first mentioned gear, and means for shifting the manually operable shaft vertically for the purpose specified.

2. A wind mill comprising a support, a vertical shaft journaled therein, a base plate fixed to the shaft, a sleeve revoluble upon the shaft and resting upon the base plate, a rudder carried by the sleeve, a gear formed with the sleeve, a rudder adjusting shaft extending vertically through the support and base plate, a gear fixed thereto and adapted to mesh with the first mentioned gear, a hand operated screw carried by the support and provided with a bore through which the rudder adjusting shaft passes and an abutment on the last mentioned shaft to be engaged by the screw whereby to lift the rudder adjusting shaft vertically to render the rudder adjusting means inactive.

In testimony whereof I affix my signature.

ROBERT D. SCHMIDT.